(No Model.)
W. McK. JENNE.
SCREW LOCKING DEVICE.
No. 423,772. Patented Mar. 18, 1890.
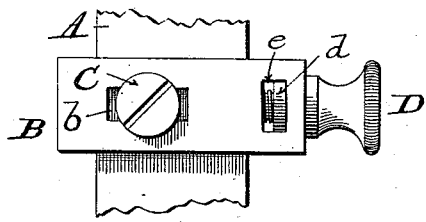
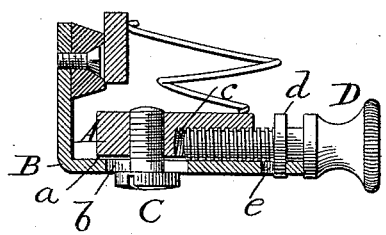
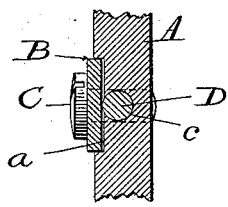
Witnesses:
James F. Duhamel.
Horace A. Dodge.
Inventor:
W. McK. Jenne,
by Dodge & Sons,
Atty.

UNITED STATES PATENT OFFICE.

WILLIAM McKENDREE JENNE, OF ILION, ASSIGNOR TO THE REMINGTON STANDARD TYPE WRITER MANUFACTURING COMPANY, OF NEW YORK, N. Y.

SCREW-LOCKING DEVICE.

SPECIFICATION forming part of Letters Patent No. 423,772, dated March 18, 1890.

Application filed July 30, 1889. Serial No. 319,192. (No model.)

*To all whom it may concern:*

Be it known that I, WILLIAM MCKENDREE JENNE, a citizen of the United States, residing at Ilion, in the county of Herkimer and State of New York, have invented certain new and useful Improvements in Means for Securing Adjusting-Screws in Position, of which the following is a specification.

My invention relates to means for securing an adjusting-screw in its adjusted positions.

The invention is designed primarily for application to type-writing machines, and I have in another application, Serial No. 315,545, made claim to the special construction herein shown. The invention is, however, capable of application to other machines, and I do not wish to limit myself to the application of the invention to any particular use or machine.

In the drawings, Figure 1 is a front face view of an adjusting-screw and the means for securing it in its adjusted positions; Fig. 2, a horizontal sectional view, and Fig. 3 a vertical transverse sectional view.

A indicates a block of wood, metal, or any other suitable material, and of any desired form or shape, the form of the block depending of course upon the machine to which the invention is applied.

B indicates a plate, which is mounted upon and adapted to move across the face of the block, the plate being guided in its movement, preferably, though not necessarily, by means of a slot $a$, formed in the face of the block. The plate B is provided with an elongated slot $b$, to receive a screw C, which, as shown in Fig. 2, screws into the body of the block, the head of the screw being of greater diameter than the width of the slot.

D indicates the adjusting-screw, which enters a threaded socket $c$ in the block A, as shown in Figs. 2 and 3, the screw D being at right angles to the screw C. Where the block A is grooved, the socket $c$ will coincide with the groove; but when the groove is omitted the socket will coincide with the outer face of the block, the object of this construction being to permit a part of the threaded portion of the adjusting-screw D to project so that the plate may come in contact therewith, as shown in Figs. 2 and 3.

Formed upon the adjusting-screw D is a collar $d$, to engage or enter a slot or opening $e$, formed in the plate, as shown in Figs. 1 and 2, the end of the plate resting against a collar $f$, also formed upon the screw. If screw C, which I term the "clamping-screw," be loosened and the adjusting-screw D be turned, the plate B will be carried backward or forward across the face of the block, according to the direction in which the screw D is turned. After the plate has been brought to the desired position the screw C is tightened up, so as to cause the plate to bear against the exposed portion of the screw D with sufficient force to prevent the latter from turning or jarring loose, and thereby destroying the adjustment of the plate. It will be noted that the plate bears upon the screw D between the collars, and that when the clamping-screw is tightened the plate will bear upon the adjusting-screw with sufficient force to prevent its becoming loose. When sufficient force can thus be applied, it will be unnecessary to have the plate bear upon the threaded portion of the adjusting-screw.

No claim is made herein to anything shown or described in my application above referred to.

Having thus described my invention, what I claim is—

1. In combination with a block, a plate movable relatively thereto, an adjusting-screw carried by the block and serving to adjust the plate, and a clamping-screw for drawing the plate against the adjusting-screw, all substantially as shown and described.

2. In combination with a grooved block, a plate mounted in the groove and provided with an elongated slot, and an opening, a socket formed in the block and coinciding with the groove, an adjusting-screw mounted in the socket and provided with a collar to engage the opening in the plate, and a clamping-screw passing through the slot in the plate and into the block.

3. In combination with a block, a plate movable relatively thereto, an adjusting-screw, and a clamping-screw for drawing the plate against the adjusting-screw.

In witness whereof I hereunto set my hand in the presence of two witnesses.

WILLIAM McKENDREE JENNE.

Witnesses:
 THOS. RICHARDSON,
 A. D. RICHARDSON.